(12) United States Patent
Chodankar et al.

(10) Patent No.: US 11,409,943 B1
(45) Date of Patent: Aug. 9, 2022

(54) SYSTEM AND METHOD FOR IMPLEMENTING A CUSTOMIZABLE DATA REPORTING MODULE

(71) Applicant: JPMorgan Chase Bank, N.A., New York, NY (US)

(72) Inventors: Amit Chodankar, Thane West (IN); Nikhil Pinto, Mumbai (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/325,601

(22) Filed: May 20, 2021

(30) Foreign Application Priority Data

Apr. 6, 2021 (IN) .............................. 202111016171

(51) Int. Cl.
| | | |
|---|---|---|
| *G06F 40/103* | (2020.01) | |
| *G06F 16/958* | (2019.01) | |
| *G06F 40/186* | (2020.01) | |
| *G06F 40/18* | (2020.01) | |
| *G06F 16/245* | (2019.01) | |

(52) U.S. Cl.
CPC .......... *G06F 40/103* (2020.01); *G06F 16/245* (2019.01); *G06F 16/986* (2019.01); *G06F 40/18* (2020.01); *G06F 40/186* (2020.01)

(58) Field of Classification Search
None
See application file for complete search history.

(56) References Cited

U.S. PATENT DOCUMENTS

| | | | | |
|---|---|---|---|---|
| 2005/0033458 A1* | 2/2005 | Brindac | ............. | G05B 23/0232 700/19 |
| 2014/0297513 A1* | 10/2014 | Fish | ...................... | G06Q 10/06 705/38 |
| 2018/0341629 A1* | 11/2018 | Brandon | ............... | G06F 40/143 |

* cited by examiner

*Primary Examiner* — Howard Cortes
(74) *Attorney, Agent, or Firm* — Greenblum & Bernstein, P.L.C.

(57) ABSTRACT

Various methods, apparatuses/systems, and media for implementing a customizable data reporting module are disclosed. A database stores an SSRS file as an SSRS.RDL file. A processor, operatively connected to the database via a network, accesses the database or a folder path to obtain the SSRS.RDL file; reads an XML content within the SSRS.RDL file; extracts, in response to reading the XML content, report layout information data of a report and database related information data of the report; implements, in response to extracting, a data migration process to store the report layout information data as an excel file and the database related information data as a JavaScript Object Notation (JSON) file; receives a request from a user to generate a report in accordance with a desired file format; and processes, in response to receiving the request, the excel file and the JSON file and automatically generates a custom report based on the desired file format.

20 Claims, 5 Drawing Sheets

SYSTEM AND METHOD FOR IMPLEMENTING A CUSTOMIZABLE DATA REPORTING MODULE

CROSS-REFERENCE TO RELATED APPLICATIONS

This application claims the benefit of priority from Indian Patent Application No. 202111016171, filed Apr. 6, 2021, which is herein incorporated by reference in its entirety.

TECHNICAL FIELD

This disclosure generally relates to data processing, and, more particularly, to methods and apparatuses for implementing a customizable data reporting module for receiving a smart maker template as an input and automatically generating a final data report based on user given parameters.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Typical expense calculator application uses SQL Server Reporting Services (SSRS) for most of its reporting needs within the application. A Microsoft offering, SSRS is a reporting software that may allow a user to produce formatted reports that may be executed on the fly based on user driven inputs. However, SSRS is windows dependent along with needing a separate install from SQL server (in newer versions). It is desirable for the expense calculator application to rid itself of the SSRS dependency by migrating existing reports to a more platform agnostic reporting technology.

In addition, the expense calculator application typically faces reporting timeout issues on complex reports with large datasets, with very little visibility into the working of SSRS reporting engine and there may not be much scope to remedy these issues. Thus, there is a need for migration from SSRS to a more suitable engine that may support complex reporting use cases, allow export to multiple formats, etc.

SUMMARY

The present disclosure, through one or more of its various aspects, embodiments, and/or specific features or sub-components, provides, among other features, various systems, servers, devices, methods, media, programs, and platforms for implementing a customizable data reporting module for receiving a smart maker template as an input and automatically generating a final data report based on user given parameters, but the disclosure is not limited thereto. The various aspects, embodiments, features, and/or sub-components may also provide optimized processes of implementing a customizable data reporting module that supports complex data reporting use cases and allows exporting the final report to multiple formats, but the disclosure is not limited thereto. The various aspects, embodiments, features, and/or sub-components may also provide optimized processes of implementing a customizable data reporting module that could be easily configured and extended for a wide variety of use cases that either existed or would come up in the future and were not addressed by conventional reporting engines (e.g., ASPOSE), but the disclosure is not limited thereto. Some sample use cases may include: renaming the final report file based on values in result set; renaming spreadsheets based on values in result set; complex report uses cases like dynamic sheets (page break in SSRS) or dynamic columns (pivot); sorting or grouping of data source; binding a report sheet wise, etc., but the disclosure is not limited thereto.

According to an aspect of the present disclosure, a method for implementing a customizable data reporting module by utilizing one or more processors and one or more memories is disclosed. The method may include: accessing a database that stores an Structured Query Language Server Reporting Services (SSRS) file as an SSRS.RDL (report definition language) file; reading an Extensible Markup Language (XML) content within the SSRS.RDL file; extracting, in response to reading the XML content, report layout information data of a report and database related information data of the report; implementing, in response to extracting, a data migration process to store the report layout information data as an excel file and the database related information data as a JavaScript Object Notation (JSON) file; receiving a request from a user to generate a report in accordance with a desired file format; and processing, in response to receiving the request, the excel file and the JSON file and automatically generating a custom report based on the desired file format.

According to yet another aspect of the instant disclosure, wherein the desired file format of the custom report may include one or more of the following file formats: .excel, .csv, and .pdf, but the disclosure is not limited thereto.

According to a further aspect of the instant disclosure, wherein the report layout information data of the report may include one or more of the following data: data corresponding to number columns in the report, data corresponding to placement of the columns in the report, data corresponding to number of rows in the report, and data corresponding to placement of the rows in the report, but the disclosure is not limited thereto.

According to an additional aspect of the instant disclosure, wherein the database related information data may include one or more of the following data: data corresponding to storing procedures and data corresponding to inline query that is patching the data in response to receiving the request, but the disclosure is not limited thereto.

According to yet another aspect of the instant disclosure, wherein the excel file may be an ASPOSE based template (but the disclosure is not limited thereto) which contains a design and a layout of the report, and the method may further include: receiving the ASPOSE based template as an input; and automatically generating the report, in response to receiving the ASPOSE based template, based on user given parameters.

According to yet another aspect of the instant disclosure, wherein the JSON file may contain settings specific to the report, but the disclosure is not limited thereto.

According to another aspect of the instant disclosure, a system for implementing a customizable data reporting module is disclosed. The system may include: a database that stores a Structured Query Language Server Reporting Services (SSRS) file as an SSRS.RDL (report definition language) fi and a processor coupled to the database via a communication network. The processor may be configured to: access the database to obtain the SSRS.RDL file; read an Extensible Markup Language (XML) content within the SSRS.RDL file; extract, in response to reading the XML content, report layout information data of a report and database related information data of the report; implement, in response to extracting, a data migration process to store the report layout information data as an excel file and the database related information data as a JavaScript Object Notation (JSON) file; receive a request from a user to generate a report in accordance with a desired file format; and process, in response to receiving the request, the excel file and the JSON file and automatically generates a custom report based on the desired file format.

According to a further aspect of the instant disclosure, wherein the excel file is an ASPOSE based template which contains a design and a layout of the report, and the processor may be further configured to: receive the ASPOSE based template as an input; and automatically generate the report, in response to receiving the ASPOSE based template, based on user given parameters.

According to yet another aspect of the present disclosure, a non-transitory computer readable medium configured to store instructions for implementing a customizable data reporting module is disclosed. The instructions, when executed, cause a processor to perform the following: accessing a database that stores a Structured Query Language Server Reporting Services (SSRS) file as an SSRS.RDL (report definition language) file; reading an Extensible Markup Language (XML) content within the SSRS.RDL file; extracting, in response to reading the XML content, report layout information data of a report and database related information data of the report; implementing, in response to extracting, a data migration process to store the report layout information data as an excel file and the database related information data as a JavaScript Object Notation (JSON) file; receiving a request from a user to generate a report in accordance with a desired file format; and processing, in response to receiving the request, the excel file and the JSON file and automatically generating a custom report based on the desired file format.

According to an additional aspect of the instant disclosure, wherein the excel file is an ASPOSE based template which contains a design and a layout of the report, and wherein, the instructions, when executed, may further cause the processor to perform the following: receiving the ASPOSE based template as an input; and automatically generating the report, in response to receiving the ASPOSE based template, based on user given parameters.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

Figure 1:
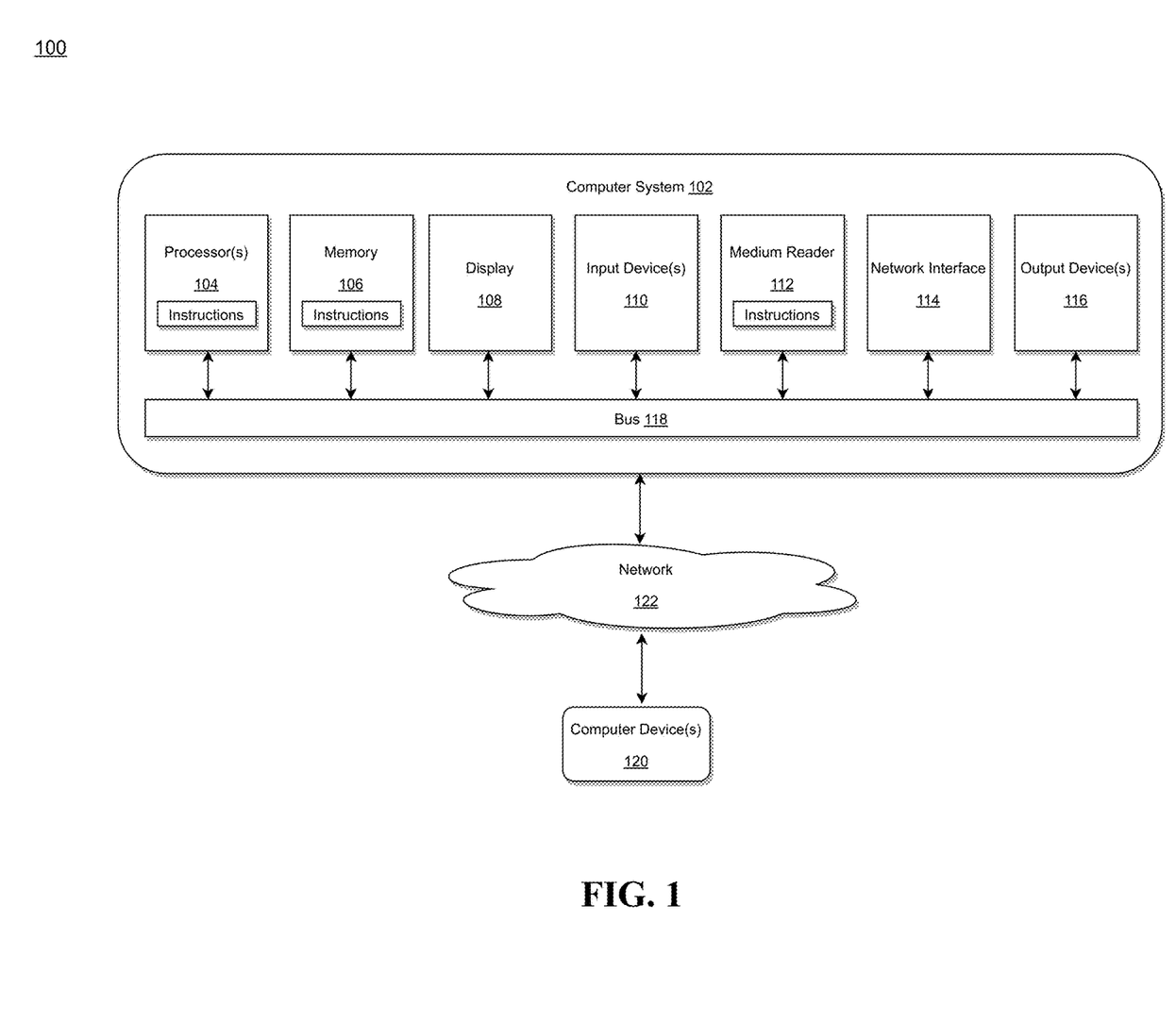
FIG. 1 illustrates a computer system for implementing a customizable data reporting device in accordance with an exemplary embodiment.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed)

network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
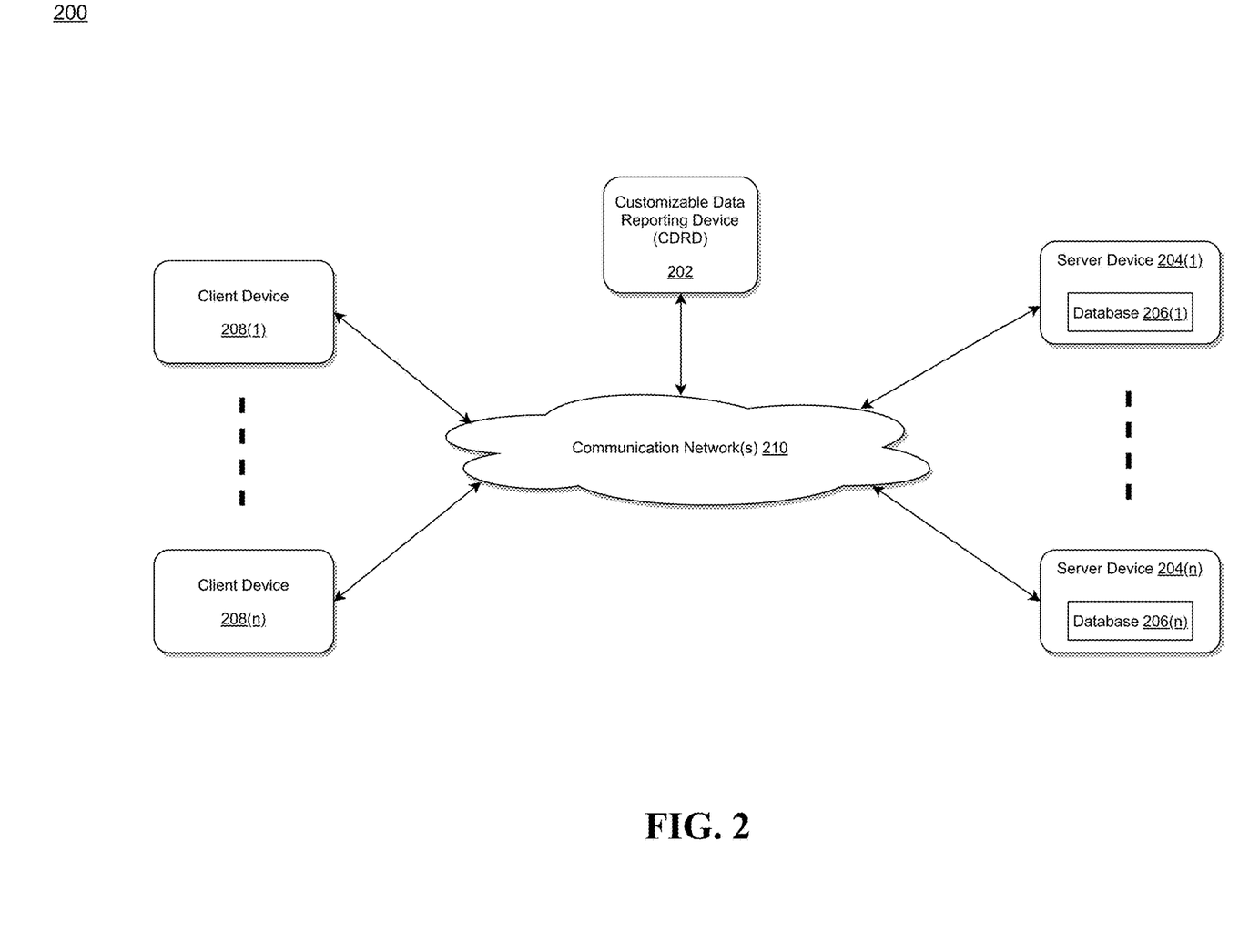
FIG. 2 illustrates an exemplary diagram of a network environment with a customizable data reporting device in accordance with an exemplary embodiment.

Referring to FIG. 2, a schematic of an exemplary network environment 200 for implementing a customizable data reporting device (CDRD) of the instant disclosure is illustrated.

According to exemplary embodiments, the above-described problems associated with conventional approach of testing software application may be overcome by implementing an CDRD 202 as illustrated in FIG. 2 that may provide a platform for implementing a customizable data reporting module for receiving a smart maker template as an input and automatically generating a final data report based on user given parameters, but the disclosure is not limited thereto. The various aspects, embodiments, features, and/or sub-components disclosed herein may also provide optimized processes of implementing the CDRD 202 which may be configured to support complex data reporting use cases and allow exporting the final report to multiple formats, but the disclosure is not limited thereto. For example, the various aspects, embodiments, features, and/or sub-components disclosed herein may also provide optimized processes of implementing the CDRD 202 which may be easily configured and extended for a wide variety of use cases that either existed or would come up in the future and were not addressed by conventional reporting engines (e.g., ASPOSE), but the disclosure is not limited thereto. Some sample use cases may include: renaming the final report file based on values in result set; renaming spreadsheets based on values in result set; complex report uses cases like dynamic sheets (page break in SSRS) or dynamic columns (pivot); sorting or grouping of data source; binding a report sheet wise, etc., but the disclosure is not limited thereto.

The CDRD 202 may be the same or similar to the computer system 102 as described with respect to FIG. 1.

The CDRD 202 may store one or more applications that can include executable instructions that, when executed by the CDRD 202, cause the CDRD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the CDRD 202 itself, may be located in virtual server(s) running in a cloud-based computing environment rather than being tied to one or more specific physical network computing devices. Also, the application(s) may be running in one or more virtual machines (VMs) executing on the CDRD 202. Additionally, in one or more embodiments of this technology, virtual machine(s) running on the CDRD 202 may be managed or supervised by a hypervisor.

In the network environment 200 of FIG. 2, the CDRD 202 is coupled to a plurality of server devices 204(1)-204(n) that hosts a plurality of databases 206(1)-206(n), and also to a plurality of client devices 208(1)-208(n) via communication network(s) 210. A communication interface of the CDRD 202, such as the network interface 114 of the computer system 102 of FIG. 1, operatively couples and communicates between the CDRD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the CDRD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s)(WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The CDRD 202 may be a standalone device or integrated with one or more other devices or apparatuses, such as one or more of the server devices 204(1)-204(n), for example. In one particular example, the CDRD 202 may be hosted by one of the server devices 204(1)-204(n), and other arrangements are also possible. Moreover, one or more of the devices of the CDRD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204 (n) may include, among other features, one or more processors, a memory, and a communication interface, which are coupled together by a bus or other communication link, although other numbers and/or types of network devices may be used. The server devices 204(1)-204(n) in this example may process requests received from the CDRD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the CDRD 202 that may efficiently provide a platform for receiving a smart maker template as an input and automatically generating a final data report based on user given parameters, but the disclosure is not limited thereto.

The client devices 208(1)-208(n) may run interface applications, such as standard web browsers or standalone client applications, which may provide an interface to communicate with the CDRD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the CDRD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the CDRD 202, the server devices 204(1)-204(n), or the client devices 208(1)-208(n), for example, may be configured to operate as virtual instances on the same physical machine. For example, one or more of the CDRD 202, the server devices 204(1)-204(n), or the client devices 208(1)-208(n) may operate on the same physical device rather than as separate devices communicating through communication network(s) 210. Additionally, there may be more or fewer CDRDs 202, server devices 204(1)-204(n), or client devices 208(1)-208(n) than illustrated in FIG. 2. According to exemplary embodiments, the CDRD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including byway of example only teletraffic in any suitable form (e.g., voice and modem), wireless traffic networks, cellular traffic networks, Packet Data Networks (PDNs), the Internet, intranets, and combinations thereof.

Figure 3:
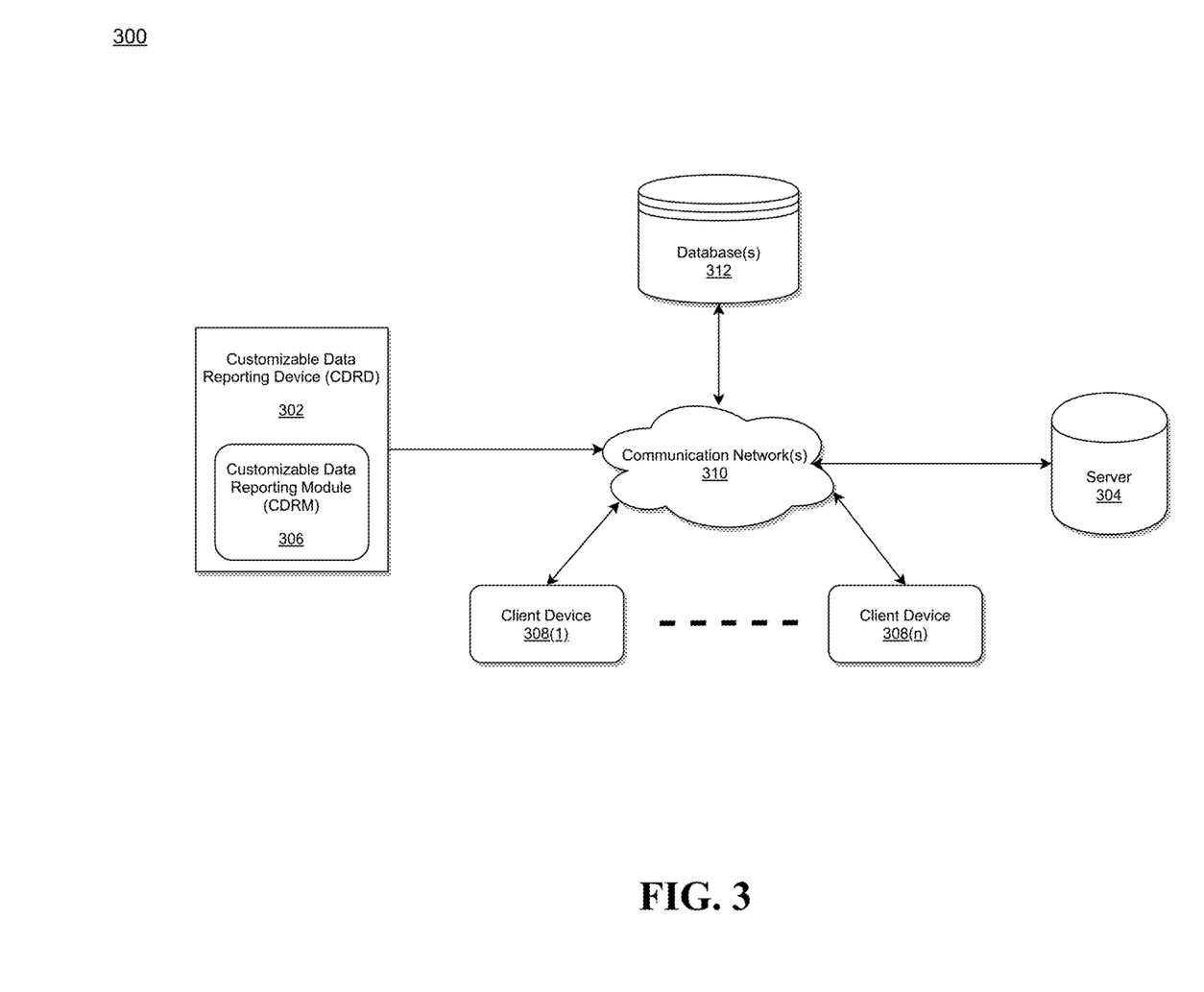
FIG. 3 illustrates a system diagram for implementing a customizable data reporting device having a customizable data reporting module in accordance with an exemplary embodiment.

FIG. 3 illustrates a system diagram for implementing a CDRD having a customizable data reporting module (CDRM) in accordance with an exemplary embodiment.

As illustrated in FIG. 3, the system 300 may include a CDRD 302 within which a CDRM 306 is embedded, a server 304, a database(s) 312, a plurality of client devices 308(1) . . . 308(n), and a communication network 310.

According to exemplary embodiments, the CDRD 302 including the CDRM 306 may be connected to the server 304, and the database(s) 312 via the communication network 310. Although there is only one database has been illustrated, the disclosure is not limited thereto. Any number of databases may be utilized. The CDRD 302 may also be connected to the plurality of client devices 308(1) . . . 308(n) via the communication network 310, but the disclosure is not limited thereto.

According to exemplary embodiment, the CDRD 302 is described and shown in FIG. 3 as including the CDRM 306, although it may include other rules, policies, modules, databases, or applications, for example. According to exemplary embodiments, the database(s) 312 may be embedded within the CDRD 302. According to exemplary embodiments, the database(s) 312 may be configured to store a Structured Query Language Server Reporting Services (SSRS) file as an SSRS.RDL (report definition language) file corresponding to one or more applications, but the disclosure is not limited thereto.

According to exemplary embodiments, the CDRM 306 may be configured to receive real-time feed of data from the plurality of client devices 308(1) . . . 308(n) via the communication network 310.

According to exemplary embodiments, as will be described below, the CDRM 306 may be configured to access the database(s) 312 or a folder path to obtain SSRS.RDL file; read an Extensible Markup Language (XML) content within the SSRS.RDL file; extract, in response to reading the XML content, report layout information data of a report and database related information data of the report; implement, in response to extracting, a data migration process to store the report layout information data as an excel file and the database related information data as a JavaScript Object Notation (JSON) file; receive a request from a user by utilizing a client device (e.g., one of the plurality of client devices 308(1) . . . 308(n)) to generate a report in accordance with a desired file format; and process, in response to receiving the request, the excel file and the JSON file and automatically generate a custom report based on the desired file format.

The plurality of client devices 308(1) . . . 308(n) are illustrated as being in communication with the CDRD 302. In this regard, the plurality of client devices 308(1) . . . 308(n) may be "clients" of the CDRD 302 and are described herein as such. Nevertheless, it is to be known and understood that the plurality of client devices 308(1) . . . 308(n) need not necessarily be "clients" of the CDRD 302, or any entity described in association therewith herein. Any additional or alternative relationship may exist between either or both of the plurality of client devices 308(1) . . . 308(n) and the CDRD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the CDRD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The CDRD 302 may be the same or similar to the CDRD 202 as described with respect to FIG. 2, including any features or combination of features described with respect thereto.

Figure 4:
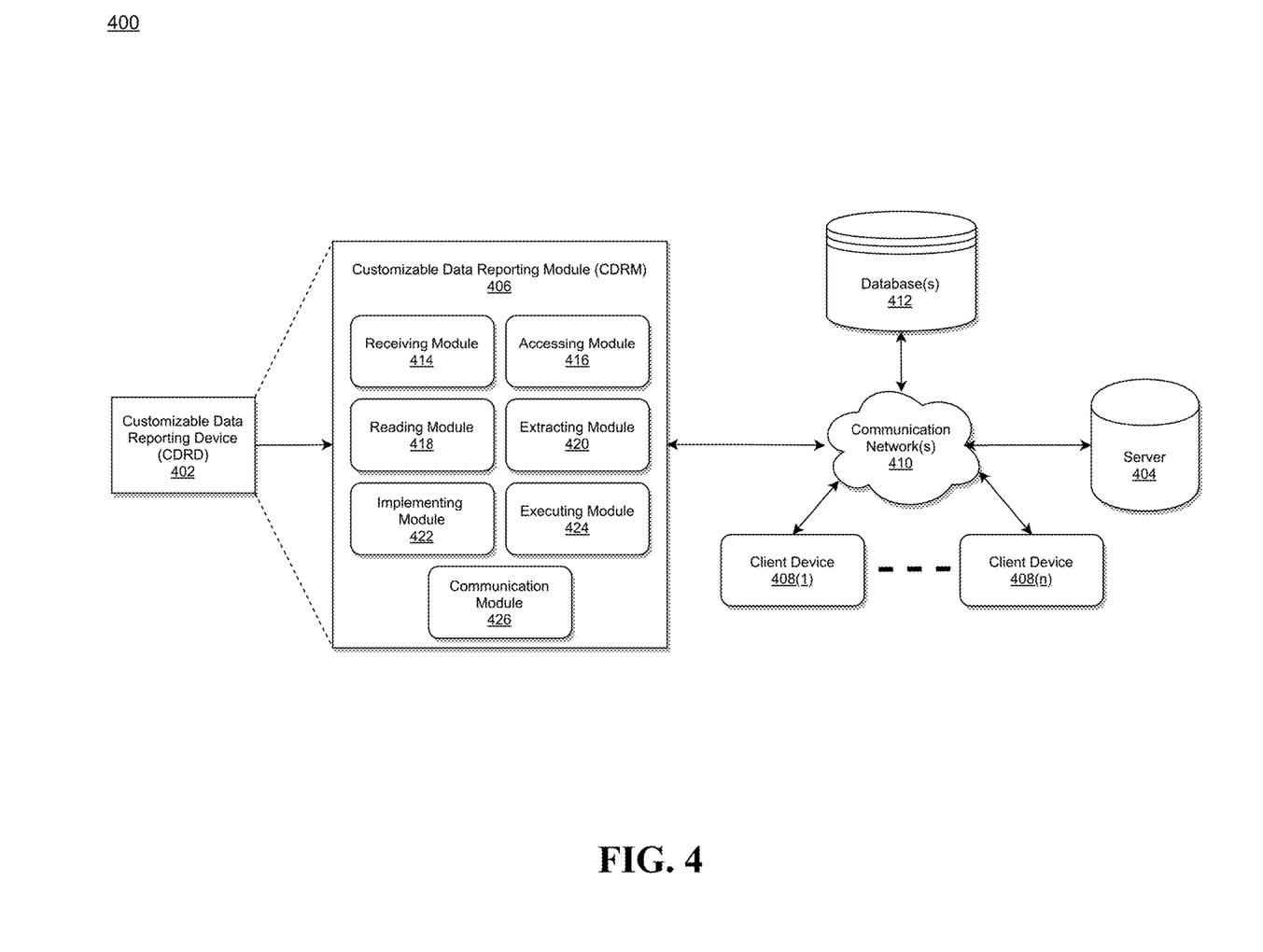
FIG. 4 illustrates a system diagram for implementing a customizable data reporting module of FIG. 3 in accordance with an exemplary embodiment.

FIG. 4 illustrates a system diagram for implementing a customizable data reporting module (CDRM) of FIG. 3 in accordance with an exemplary embodiment.

According to exemplary embodiments, the system 400 may include a customizable data reporting device (CDRD) 402 within which a CDRM 406 is embedded, a server 404, a database(s) 412, and a communication network 410.

According to exemplary embodiments, the CDRD 402 including the CDRM 406 may be connected to the server 404, and the database(s) 412 via the communication network 410. The CDRD 402 may also be connected to the plurality of client devices 408(1) . . . 408(n) via the communication network 410, but the disclosure is not limited thereto. According to exemplary embodiments, the CDRD 402, the CDRM 406, the database(s) 412, the server 404, the client devices 408(1)-408(n), and the communication network 410 as illustrated in FIG. 4 may be the same or similar to the CDRD 302, the CDRM 306, the database(s) 312, the server 304, the client devices 308(1)-308(n), and the communication network 310, respectively, as illustrated in FIG. 3.

According to exemplary embodiments, as illustrated in FIG. 4, the CDRM 406 may include a receiving module 414, an accessing module 416, a reading module 418, an extracting module 420, an implementing module 422, an executing module 424, and a communication module 426.

The process may be executed via the communication module 426 and the communication network 410, which may comprise plural networks as described above. For example, in an exemplary embodiment, the various components of the CDRM 406 may communicate with the server 404, and the database(s) 412 via the communication module 432 and the communication network 410. Of course, these embodiments are merely exemplary and are not limiting or exhaustive.

According to exemplary embodiments, the communication network 410 and the communication module 432 may be configured to establish a link between the database(s) 412, the client devices 408(1)-408(n) and the CDRM 406.

According to exemplary embodiments, each of the receiving module 414, accessing module 416, reading module 418, extracting module 420, implementing module 422, executing module 424, and the communication module 426 may be implemented by microprocessors or similar, they may be programmed using software (e.g., microcode) to perform various functions discussed herein and may optionally be driven by firmware and/or software. Alternatively, each of the receiving module 414, accessing module 416, reading module 418, extracting module 420, implementing module 422, executing module 424, and the communication module 426 may be implemented by dedicated hardware, or as a combination of dedicated hardware to perform some functions and a processor (e.g., one or more programmed microprocessors and associated circuitry) to perform other functions. Also, according to exemplary embodiments, each of receiving module 414, accessing module 416, reading module 418, extracting module 420, implementing module 422, executing module 424, and the communication module 426 may be physically separated into two or more interacting and discrete blocks, units, devices, and/or modules without departing from the scope of the inventive concepts.

According to exemplary embodiments, each of the receiving module 414, accessing module 416, reading module 418, extracting module 420, implementing module 422, executing module 424, and the communication module 426 of the CDRM 406 may be called by corresponding API, but the disclosure is not limited thereto.

According to exemplary embodiments, the accessing module 416 may be configured to access the database(s) 412 or a folder path to obtain an SSRS.RDL file. The reading module 418 may be configured to read an Extensible Markup Language (XML) content within the SSRS.RDL file.

In SSRS, developers typically design reports using a report designer tool. SSRS stores the information in a file with .RDL extension whose content is XML based. The XML is highly nondeterministic with n-level nesting of nodes present. To automate the process of migration, the CDRM 406 is configured to traverse the XML to pull out the required information. For example, the extracting module designed in Excel by the DCRM 406. A sample ASPOSE smart marker syntax may be seen in row number 2 of the Table 1 below.

TABLE 1

| A | B | C | D |
|---|---|---|---|
| 1 Fund Number | Fund Name | Total Amount | |
| 2 &=SummaryDataSet.FundNumber | &=SummaryDataSet.FundName | &=SummaryDataSet.TotatAmount | |
| 3 | | | |
| 4 | | | |

420 may be configured to extract, in response to reading the XML content, report layout information data of a report and database related information data of the report.

The implementing module 422 may be configured to implement, in response to extracting, a data migration process to store the report layout information data as an excel file and the database related information data as a JavaScript Object Notation (JSON) file. The receiving module 414 may be configured to receive a request from a user from a client device (e.g., one of the client devices 408(1) . . . 408(n)) to generate a report in accordance with a desired file format. The executing module 424 may be configured to process, in response to receiving the request, the excel file and the JSON file and automatically generate a custom report based on the desired file format.

According to exemplary embodiments, the desired file format of the custom report may include one or more of the following file formats: .excel, .csv, and .pdf, but the disclosure is not limited thereto.

According to exemplary embodiments, the report layout information data of the report may include one or more of the following data: data corresponding to number columns in the report, data corresponding to placement of the columns in the report, data corresponding to number of rows in the report, and data corresponding to placement of the rows in the report, but the disclosure is not limited thereto.

According to exemplary embodiments, the database related information data may include one or more of the following data: data corresponding to storing procedures and data corresponding to inline query that is patching the data in response to receiving the request, but the disclosure is not limited thereto.

According to exemplary embodiments, the excel file may be an ASPOSE based template which may contain a design and a layout of the report. The receiving module 414 may be configured to receive the ASPOSE based template as an input; and the executing module 424 may be configured to automatically generate the report, in response to receiving the ASPOSE based template, based on user given parameters.

ASPOSE may provide a feature called smart markers, which are used by ASPOSE to know what information to place in a Microsoft Excel designer spreadsheet. The CDRM 406 is configured in a manner such that application developers may empower smart markers to create design time templates that contain formatting information, layout of the data and the data itself to be displayed. Based on user request, the CDRM 406 is configured to process these templates against a given data source to generate a final report. According to exemplary embodiments, these smart makers may be utilized by the DCRM 406 to address a variety of uses cases. According to exemplary embodiments, there is no need for any report designer tool since report is The smart marker takes the shape of: &=<DataSource>.<ColumnName>. The maker when processed against the data source will fill in the data based on the type of marker.

The DCRM 406 is configured such that it can create an engine that could be easily configured and extended for the wide variety of use cases that either existed or would come up in the future and were not addressed by ASPOSE. Some sample use cases may include, but not limited thereto: renaming the final report file based on values in result set; renaming spreadsheets based on values in result set; complex report uses cases, e.g., dynamic sheets (page break in SSRS) or dynamic columns (pivot); sorting or grouping of data source; binding a report sheet wise, etc.

According to exemplary embodiments, to address this, the DCRM 406 first created a wrapper around ASPOSE (aspose-.Cells) which would provide a leverage to extend and implement custom functionality as and when required. This would form the core of the reporting engine within the DCRM 406 which is built using .NET Standard 2.1 and labelled the component as "AsposeReportGenerator".

Second, to make the engine configurable, the DCRM 406 created a second design time template in the form of a JSON file (similar to an application setting or an application configuration file). Each setting in this file was implemented by the implementing module 422 of the DCRM 406 in the form of a class called props. Each new requirement could be addressed with a new props class which the reporting engine would then use to implement the desired functionality, thereby providing an adequate degree of decoupling and allowing for easy independent extension in utilizing in future use cases.

According to exemplary embodiments, below is an example of a props setting that allows for sorting on the data source.

"SortDataTableProps": [
  {
    "DataTableName": "SummaryDataTable",
    "ColumnsWithSortOrder": "Name ASC, Age DESC"
  }
]

According to exemplary embodiments, the JSON file may contain settings specific to the report, but the disclosure is not limited thereto. For example, the JSON setting file can be easily prepared by the developer utilizing the DCRM 406 and will include whichever prop is needed as per the report requirement. With this JSON file, the reporting engine within the DCRM 406 can now be easily extended to implement new features as the need arises. With these two inputs of ASPOSE based excel template and JSON setting file, the DCRM 406 can generate a final report.

According to exemplary embodiments, the CDRM 406 is configured such that migration of older reports should be one time effort which would produce a design time templates that could then be used to render final report as and when required basis. According to exemplary embodiments, the CDRM 406 is further configured in a manner to support existing complex reporting use cases; support ADA compliance; allow export to multiple formats; handle large data volumes and have quick binding times; and allow for reports to be delivered over the wire (reporting as a service), but the disclosure is not limited thereto.

According to exemplary embodiments, the DCRM 406 is configured in a manner such that in designing the reporting engine within the DCRM 406, a user is provided with transparency on the report generation process, e.g., a user having the ability to view and monitor each step of the report generation process by utilizing the DCRM 406. The reporting engine of conventional SSRS is effectively a black box in this regard with only two check points. One, when the query or stored procedure was fired to the data source and second, when the binding of report was completed. During triage of production issues it is often impossible to tell which step of the report generation process was taking time.

According to exemplary embodiments, building a custom reporting engine by utilizing the DCRM 406 enables a user to add logging at each step of the report generation process. This allows log data collection which can be pushed to SPLUNK and help in triaging production issues.

According to exemplary embodiments, the entire reporting engine within the DCRM 406 may be exposed as a restful micro service (built as .NET Core API) that any consumer can call via a simple HTTP GET.

According to exemplary embodiments, the DCRM 406 may be configured in a manner such that it can speed up migrating existing reports. For the actual migration of reports, according to exemplary embodiments, the DCRM 406 may be configured to traverse the XML based SSRS .RDL file and convert it into an ASPOSE based template which would contain the design and layout of the report and a JSON setting file which would contain settings specific to the report. The XML in a SSRS .RDL file is highly non-deterministic following no concrete pattern with n-level nesting of nodes present. To traverse the XML file, the DCRM 406 utilized XDocument class which is a .NET offering to address XML.

Since migration is a onetime activity, the DCRM 406 may be configured to build a desktop application that would run as a wizard and guide the user through the migration process step by step. To complete the migration process, the DCRM 406 may be configured to add a comparison step that would allow a user to compare reports generated via SSRS and the report generated by the executing module 424 of the DCRM 406, and look for discrepancies. Listed below are exemplary steps the wizard walks the user through: select folder containing reports for migration; analyze the reports; select and migrate reports; execute the report via the reporting engine implemented by the DCRM 406 and SSRS; compare the reports for discrepancies, but the disclosure is not limited thereto.

Figure 5:
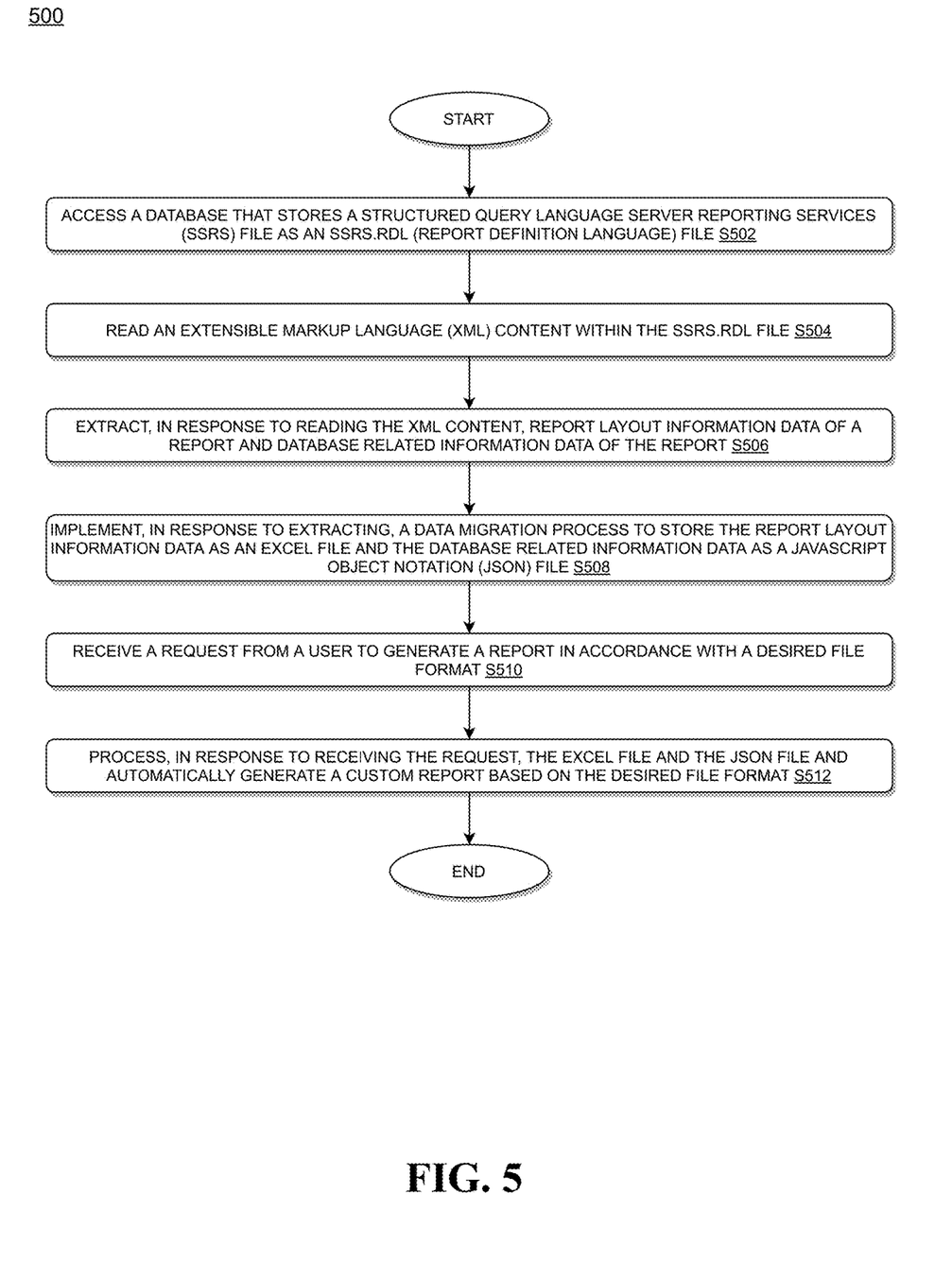
FIG. 5 illustrates a flow chart for implementing a customizable data reporting module in accordance with an exemplary embodiment.

FIG. 5 illustrates a flow chart of a process 500 implemented by the CDRM 406 of FIG. 4 in accordance with an exemplary embodiment.

As illustrated in FIG. 5, at step 502, the process 500 may include accessing a database that stores Structured Query Language Server Reporting Services (SSRS) file as an SSRS.RDL (report definition language) file.

At step 504, the process 500 may include reading an Extensible Markup Language (XML) content within the SSRS.RDL file.

At step 506, the process 500 may include extracting, in response to reading the XML content, report layout information data of a report and database related information data of the report.

At step 508, the process 500 may include implementing, in response to extracting, a data migration process to store the report layout information data as an excel file and the database related information data as a JavaScript Object Notation (JSON) file.

At step 510, the process 500 may include receiving a request from a user to generate a report in accordance with a desired file format.

At step 512, the process 500 may include processing, in response to receiving the request, the excel file and the JSON file and automatically generating a custom report based on the desired file format.

According to exemplary embodiments, the excel file may be an ASPOSE based template which contains a design and a layout of the report; and the process 500 may further include: receiving the ASPOSE based template as an input; and automatically generating the report, in response to receiving the ASPOSE based template, based on user given parameters.

According to exemplary embodiments, the CDRD 402 may include a memory (e.g., a memory 106 as illustrated in FIG. 1) which may be a non-transitory computer readable medium that may be configured to store instructions for implementing a CDRM 406 as disclosed herein. The CDRD 402 may also include a medium reader (e.g., a medium reader 112 as illustrated in FIG. 1) which may be configured to read any one or more sets of instructions, e.g., software, from any of the memories described herein. The instructions, when executed by a processor embedded within the CDRM 406 or within the CDRD 402, may be used to perform one or more of the methods and processes as described herein. In a particular embodiment, the instructions may reside completely, or at least partially, within the memory 106, the medium reader 112, and/or the processor 104 (see FIG. 1) during execution by the CDRD 402.

According to exemplary embodiments, the instructions, when executed, may cause the processor 104 to perform the following: accessing a database that stores a Structured Query Language Server Reporting Services (SSRS) file as an SSRS.RDL (report definition language) file; reading an Extensible Markup Language (XML) content within the SSRS.RDL file; extracting, in response to reading the XML content, report layout information data of a report and database related information data of the report; implementing, in response to extracting, a data migration process to store the report layout information data as an excel file and the database related information data as a JavaScript Object Notation (JSON) file; receiving a request from a user to generate a report in accordance with a desired file format; and processing, in response to receiving the request, the excel file and the JSON file and automatically generating a custom report based on the desired file format.

According to exemplary embodiments, wherein the excel file may be an ASPOSE based template which contains a design and a layout of the report, and wherein, the instructions, when executed, may further cause the processor 104 to perform the following: receiving the ASPOSE based template as an input; and automatically generating the report, in response to receiving the ASPOSE based template, based on user given parameters.

According to exemplary embodiments as disclosed above in FIGS. 1-5, technical improvements effected by the instant disclosure may include a platform for implementing a customizable data reporting module for receiving a smart maker template as an input and automatically generating a final data report based on user given parameters, but the disclosure is not limited thereto. According to exemplary embodiments as disclosed above in FIGS. 1-5, technical improvements effected by the instant disclosure may further include a platform for implementing a customizable data reporting module that supports complex data reporting use cases and allows exporting the final report to multiple formats, but the disclosure is not limited thereto. According to exemplary embodiments as disclosed above in FIGS. 1-5, technical improvements effected by the instant disclosure may further include a platform for implementing a customizable data reporting module that could be easily configured and extended for a wide variety of use cases that either existed or would come up in the future and were not addressed by conventional reporting engines (e.g., ASPOSE), but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims we incorporated into the Detailed Description, with each claim standing on its own as defining separately claimed subject matter.

The above disclosed subject matter is to be considered illustrative, and not restrictive, and the appended claim are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing a customizable data reporting module by utilizing one or more processors and one or more memories, the method comprising:
    accessing a database that stores a Structured Query Language Server Reporting Services (SSRS) file as an SSRS.RDL (report definition language) file;
    reading an Extensible Markup Language (XML) content within the SSRS.RDL file;
    extracting, in response to reading the XML content, report layout information data of a report and database related information data of the report;
    implementing, in response to extracting, a data migration process to store the report layout information data as a spreadsheet file and the database related information data as a JavaScript Object Notation (JSON) file;
    receiving a request from a user to generate a report in accordance with a desired file format; and
    processing, in response to receiving the request, the spreadsheet file and the JSON file and automatically generating a custom report based on the desired file format.

2. The method according to claim 1, wherein the desired file format of the custom report includes one or more of the following file formats: .excel, .csv, and .pdf.

3. The method according to claim 1, wherein the report layout information data of the report includes one or more of the following data: data corresponding to number columns in the report, data corresponding to placement of the columns in the report, data corresponding to number of rows in the report, and data corresponding to placement of the rows in the report.

4. The method according to claim 1, wherein the database related information data includes one or more of the following data: data corresponding to storing procedures and data corresponding to inline query that is patching the data in response to receiving the request.

5. The method according to claim 1, wherein the spreadsheet file is a file manipulation application programming interface (API) based template which contains a design and a layout of the report.

6. The method according to claim 5, further comprising:
    receiving the file manipulation API based template as an input; and
    automatically generating the report, in response to receiving the file manipulation API based template, based on user given parameters.

7. The method according to claim 1, wherein the JSON file contains settings specific to the report.

8. A system for implementing a customizable data reporting module, the system comprising:
    a database that stores a Structured Query Language Server Reporting Services (SSRS) file as an SSRS.RDL (report definition language) file; and
    a processor coupled to the database via a communication network, wherein the processor is configured to:
        access the database to obtain the SSRS.RDL file;
        read an Extensible Markup Language (XML) content within the SSRS.RDL file;
        extract, in response to reading the XML content, report layout information data of a report and database related information data of the report;
        implement, in response to extracting, a data migration process to store the report layout information data as a spreadsheet file and the database related information data as a JavaScript Object Notation (JSON) file;
        receive a request from a user to generate a report in accordance with a desired file format; and
        process, in response to receiving the request, the spreadsheet file and the JSON file and automatically generates a custom report based on the desired file format.

9. The system according to claim 8, wherein the desired file format of the custom report includes one or more of the following file formats: .excel, .csv, and .pdf.

10. The system according to claim 8, wherein the report layout information data of the report includes one or more of the following data: data corresponding to number columns in the report, data corresponding to placement of the columns in the report, data corresponding to number of rows in the report, and data corresponding to placement of the rows in the report.

11. The system according to claim 8, wherein the database related information data includes one or more of the following data: data corresponding to storing procedures and data corresponding to inline query that is patching the data in response to receiving the request.

12. The system according to claim 8, wherein the spreadsheet file is a file manipulation application programming interface (API) based template which contains a design and a layout of the report.

13. The system according to claim 12, wherein the processor is further configured to:
    receive the file manipulation API based template as an input; and
    automatically generate the report, in response to receiving the file manipulation API based template, based on user given parameters.

14. The system according to claim 8, wherein the JSON file contains settings specific to the report.

15. A non-transitory computer readable medium configured to store instructions for implementing a customizable data reporting module, wherein, when executed, the instructions cause a processor to perform the following:
    accessing a database that stores a Structured Query Language Server Reporting Services (SSRS) file as an SSRS.RDL (report definition language) file;
    reading an Extensible Markup Language (XML) content within the SSRS.RDL file;
    extracting, in response to reading the XML content, report layout information data of a report and database related information data of the report;
    implementing, in response to extracting, a data migration process to store the report layout information data as a spreadsheet file and the database related information data as a JavaScript Object Notation (JSON) file;
    receiving a request from a user to generate a report in accordance with a desired file format; and
    processing, in response to receiving the request, the spreadsheet file and the JSON file and automatically generating a custom report based on the desired file format.

16. The non-transitory computer readable medium according to claim 15, wherein the desired file format of the custom report includes one or more of the following file formats: .excel, .csv, and .pdf.

17. The non-transitory computer readable medium according to claim 15, wherein the report layout information data of the report includes one or more of the following data: data corresponding to number columns in the report, data corresponding to placement of the columns in the report, data corresponding to number of rows in the report, and data corresponding to placement of the rows in the report.

18. The non-transitory computer readable medium according to claim 15, wherein the database related information data includes one or more of the following data: data corresponding to storing procedures and data corresponding to inline query that is patching the data in response to receiving the request.

19. The non-transitory computer readable medium according to claim 15, wherein the spreadsheet file is a file manipulation application programming interface (API) based template which contains a design and a layout of the report, and wherein, the instructions, when executed, further cause the processor to perform the following:
  receiving the file manipulation API based template as an input; and
  automatically generating the report, in response to receiving the file manipulation API based template, based on user given parameters.

20. The non-transitory computer readable medium according to claim 15, wherein the JSON file contains settings specific to the report.

\* \* \* \* \*